Jan. 20, 1959 A. K. JENSEN 2,870,347
BISTABLE TRANSISTOR CIRCUIT
Filed Sept. 24, 1956
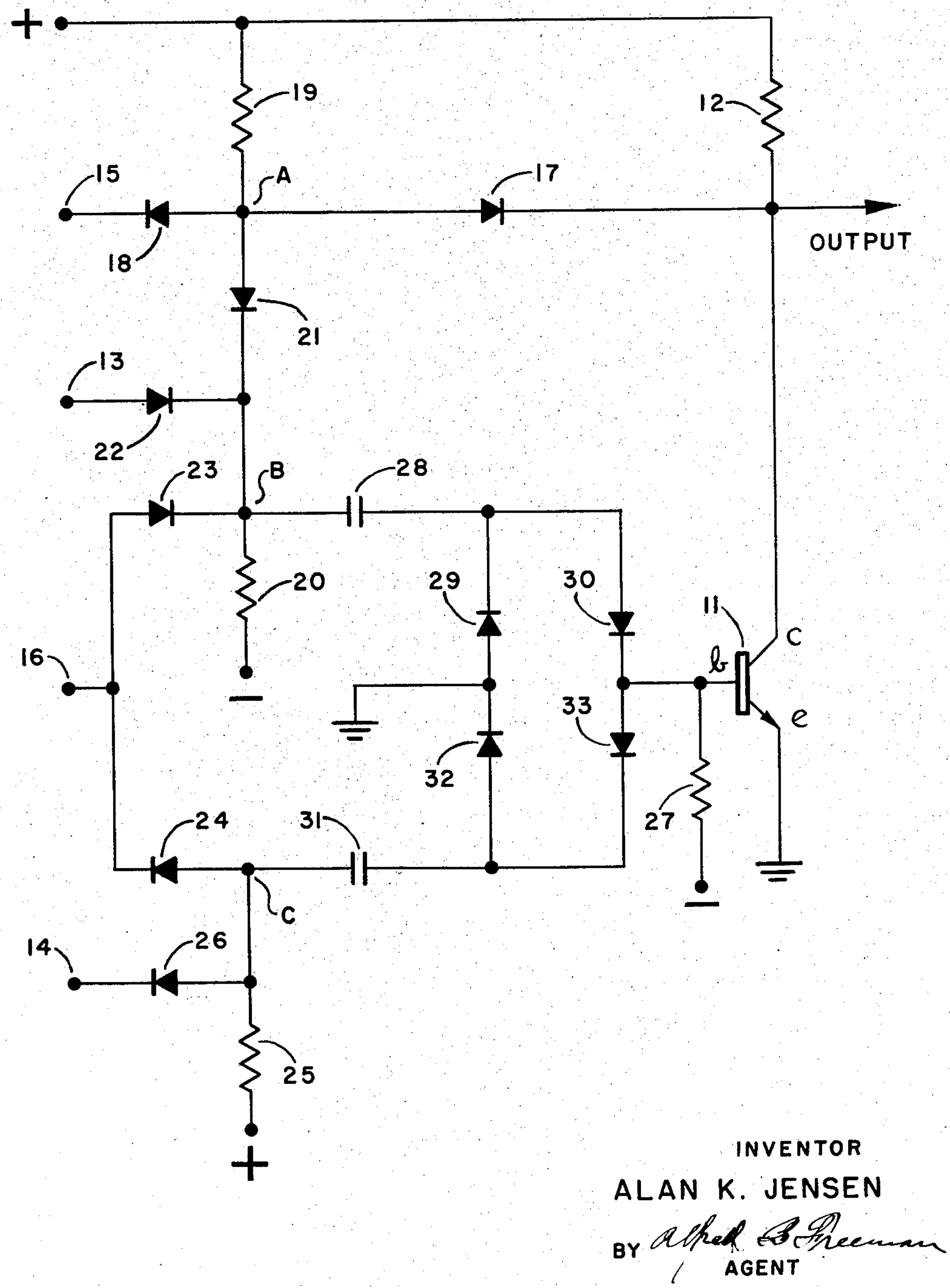
INVENTOR
ALAN K. JENSEN
BY Alfred B. Freeman
AGENT

United States Patent Office 2,870,347
Patented Jan. 20, 1959

2,870,347

BISTABLE TRANSISTOR CIRCUIT

Alan Kimble Jensen, Kenvil, N. J., assignor to Monroe Calculating Machine Company, Orange, N. J., a corporation of Delaware Application September 24, 1956, Serial No. 611,689

2 Claims. (Cl. 307—88.5)

This invention relates to a bistable circuit using a single junction type transistor as the active element.

The bistable circuit of the instant invention is set to one condition by one type of input and to its other condition by another type of input. Maintaining the circuit in one condition required a continuing series of clock pulses. Bistable circuits of this type have many uses in digital computers and other digital data handling and processing equipments.

An object of the invention is a bistable circuit using a single inexpensive transistor.

A further object of the invention is an economical bistable transistor circuit which will operate at a high rate of speed.

Other objects and a fuller understanding of the invention may be had by referring to the following description and claims, taken in conjunction with the accompanying drawing in which:

The figure is a schematic diagram of one embodiment of the invention.

Referring now to the figure, transistor 11 has base *b*, collector *c*, and emitter *e* electrodes and is of the NPN junction type such as that described in U. S. Patent No. 2,569,347. It will be obvious to those skilled in the art that a PNP junction type transistor could be used as well by making appropriate changes in the polarities of applied voltages, signals, and rectifiers.

The emitter *e* of transistor 11 is connected to ground and the collector *c* to the positive voltage supply through load resistor 12. Resistor 19, rectifier 21, and resistor 20 are in series between the positive and negative voltage supplies in the order named. Rectifier 17 is connected between collector *c* and point A, the junction of resistor 19 and rectifier 21. Terminal 15 is coupled to point A by rectifier 18. Terminals 13 and 16 are coupled to point B, the junction of resistor 20 and rectifier 21, by rectifiers 22 and 23 respectively.

Condenser 28 and rectifier 29 are in series between point B and ground. Rectifier 30 is connected between the base *b* of transistor 11 and the junction of condenser 28 and rectifier 29. Resistor 27 couples base *b* to the negative voltage supply. Rectifier 24 and resistor 25 are in series between terminal 16 and the positive voltage supply. Rectifier 26 is connected between terminal 14 and point C, the junction of rectifier 24 and resistor 25. Condenser 31 and rectifier 32 are in series between point C and ground. Rectifier 33 is connected between the base *b* and the junction of condenser 31 and rectifier 32.

Terminals 14 and 15 are normally held at positive potentials and terminals 13 and 16 at ground potential. Positive going clock pulses are applied to terminal 13 and negative going clock pulses to terminal 14 concurrently at regular intervals. A negative going signal is applied to terminal 15 to set the circuit to the "on" condition and a positive going signal to terminal 16 to set it to the "off" condition. The circuit is considered "on" and "off" when transistor 11 is conducting and not conducting respectively. The output is taken from collector *c*.

When transistor 11 is not conducting, its collector *c* will be at a positive potential and rectifier 17 will be cut off. With terminal 15 at its normally positive potential, rectifier 18 will also be cut off. Points A and B will be positive due to the relative sizes of resistors 19 and 20. With point B held positive, the positive clock pulses applied to terminal 13 can have no effect. Transistor 11 has a negative voltage applied to its base *b* through the resistor 27 and will be held cut off. The circuit will remain in this "off" condition until a turn on signal lowers terminal 15 to ground potential.

Lowering terminal 15 to ground potential causes rectifier 18 to conduct. The additional voltage drop across resistor 19 lowers the potential on point A to near ground potential. With terminals 13 and 16 also at ground potential, the potential on point B drops. This drop is delayed only by the time required for condenser 28 to discharge through resistor 20 and rectifier 29. Condenser 28 and resistor 20 will be sized so that this time will be short compared to the interval between clock pulses.

The next positive clock pulse applied to terminal 13 causes rectifier 22 to conduct. This charges condenser 28 and raises point B to a positive potential. Condenser 28 charges by drawing electrons through rectifier 30 as rectifier 29 offers a high impedance to current in this direction. The current through rectifier 30 produces an additional drop across resistor 27 to pull base *b* positive and cause transistor 11 to start to conduct.

As soon as base *b* is positive, electrons are drawn from it and from ground through rectifiers 32 and 33. The forward base *b* to emitter *e* resistance is much lower than the forward resistance offered by rectifiers 32 and 33. Most of the electrons are, therefore, drawn from base *b*. When the positive clock pulse ends, condenser 28 again discharges through resistor 20 and rectifier 29. Rectifier 30 blocks current from base *b* in this direction.

The electrons drawn from base *b* leave it with an excess positive charge when the positive clock pulse ends. Transistor 11 will remain conducting until this positive charge is dissipated. The time required for the charge to be dissipated depends on the amount of charge and the storage time of the transistor 11. This time is made longer than the interval between clock pulses. Each following positive clock pulse will produce a positive charge on the base *b* in the same manner as long as the potential on point B is allowed to drop between pulses. This maintains transistor 11 in a continuously conducting state.

With transistor 11 conducting, the voltage on its collector *c* will be near ground potential due to the drop across resistor 12. Rectifier 17 will then conduct to hold point A near ground potential. The turn on signal can then be removed and terminal 15 returned to its normal positive potential. The circuit will then stay in this condition with each positive clock pulse producing a charge on base *b* to keep transistor 11 conducting until a turn off signal is applied.

If the turn on signal is synchonized with the clock pulses, it need only be as long as the interval between successive clock pulses. If it is not synchronized with the clock pulses, it should be nearly twice as long to insure that condenser 28 can discharge fully at least once. This will guarantee that base *b* receives a sufficient charge to keep transistor 11 conducting until arrival of the next clock pulse.

The circuit is turned "off" by raising terminal 16 to a positive potential. Rectifier 23 will then conduct to hold point B at a positive potential and keep condenser 28 charged. The positive clock pulses will then be ineffective and base *b* will receive no further charge. Transistor 11 will then stop conducting at the end of its storage time. The voltage on collector *c* will go positive and permit the voltage on point A to rise with it. This will hold point B positive and the circuit will remain "off" until another input is applied to terminal 15 to turn it "on" again.

While transistor 11 would be turned off by the just described action, the time required after arrival of the turn off signal would vary with differences in transistor storage time and in the amount of excess charge which had been built up on base *b*. In many cases, a faster and more definite turn off action is desired. This is provided by the negative clock pulses applied to terminal 14 and the circuitry associated with condenser 31.

Condenser 31 and its associated circuitry functions with the negative clock pulses similarly to the way in which condenser 28 and its associated circuitry functions with the positive clock pulses. With terminal 16 at ground potential, rectifier 24 conducts and holds point C also near ground potential. The negative clock pulses applied to terminal 14 are then ineffective.

When the turn off signal drives terminal 16 positive, rectifier 24 cuts off. Point C then rises positively as condenser 31 charges through resistor 25 and rectifier 32. The next negative clock pulse applied to terminal 14 again lowers the potential on point C by causing rectifier 26 to conduct. Condenser 31 then discharges through rectifier 33 and drives the base *b* negative. This removes the excess charge on base *b* and cuts transistor 11 off almost immediately. The shunting of the negative pulse by the forward resistance of rectifier 29 and 30 is not effective until base *b* goes negative and so does not affect the operation.

Although the invention has been discussed with a certain degree of particularity, it is understood that the present disclosure has been made only by way of example and that numerous changes in the details of construction and the combination and arrangements of parts may be resorted to without departing from the spirit and scope of the invention as hereinafter claimed.

What is claimed is:

1. A bistable circuit comprising a transistor having base, collector and emitter electrodes, a plurality of sources of direct current potential each respectively connected to one of said electrodes, a voltage divider including a first resistor and a second resistor, a first unilateral conducting device connected between said first and second resistors connected between two of said sources of direct current potential, a second unilateral conducting device connected between one terminal of said first unilateral conducting device and said collector electrode, a first signal source, a third unilateral conducting device connected between said one terminal of said first unilateral conducting device and said first signal source, a source of repetitive pulses, a fourth unilateral conducting device connected between said source of repetitive pulses and the other terminal of said first unilateral conducting device, a condenser having one terminal connected to the other terminal of said first unilateral conducting device, a fifth unilateral conducting device connected between the other terminal of said condenser and said base electrode, a sixth unilateral conducting device connected between the other terminal of said condenser and a third one of said sources of direct current potential, a second signal source and a seventh unilateral conducting device connected between the other terminal of said first unilateral conducting device and said second signal source whereby signals from one of said signal sources set said transistor to a continuous conductive state and signals from the other of said signal sources set said transistor to a non-conductive state.

2. The circuit as set forth in claim 1 further including a second source of repetitive pulses, an eighth unilateral conducting device having one terminal connected to said second source of repetitive pulses, a second condenser having one terminal connected to the other terminal of said eighth unilateral conducting device, a ninth unilateral conducting device connected between the other terminal of said second condenser and said base electrode, a tenth unilateral conducting device connected between the other terminal of said second condenser and said third of said sources of direct current potential, an eleventh unilateral conducting device connected between said one terminal of said second condenser and said second signal source and a connection between said one terminal of said second condenser and one of the two of said sources of direct current potential.

References Cited in the file of this patent

Article entitled, "The Transistor Regenerative Amplifier as a Computer Element" by G. B. B. Chaplin, Proceedings of The Institution of Electrical Engineers, vol. 101, part 111, No. 73, pps. 298 to 307 inclusive, September 1954.